Oct. 7, 1958      A. K. JACKSON ET AL      2,854,911
TOOL-BAR FOR AGRICULTURAL IMPLEMENTS
Filed Sept. 25, 1953
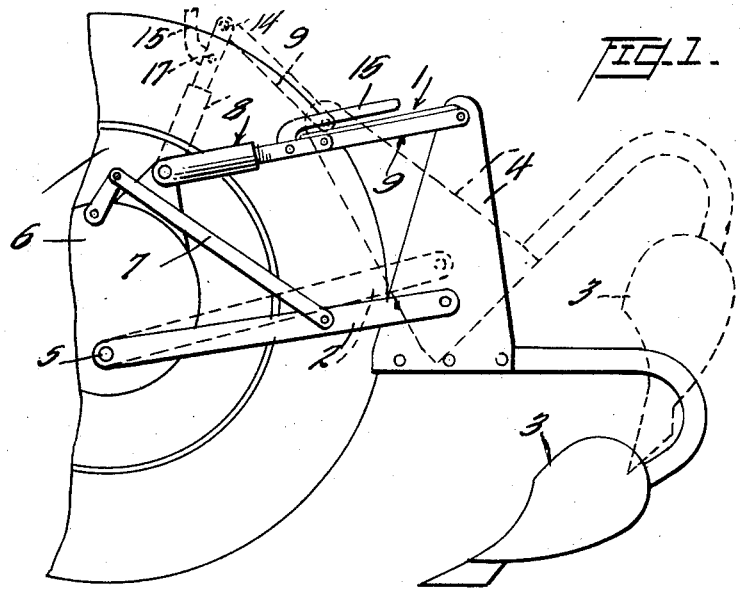
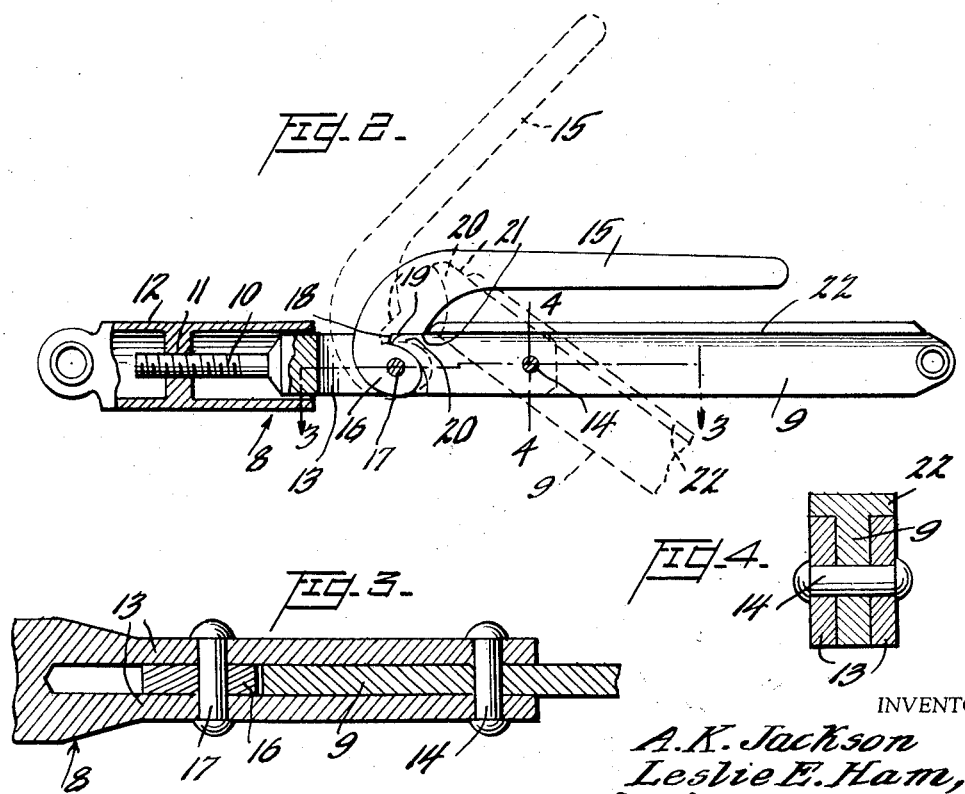
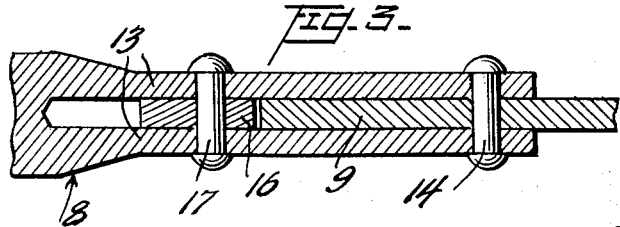
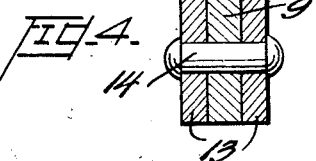
INVENTORS
A. K. Jackson
Leslie E. Ham,
BY John Boyle
ATTORNEY

United States Patent Office 2,854,911
Patented Oct. 7, 1958

2,854,911

TOOL-BAR FOR AGRICULTURAL IMPLEMENTS

Archibald K. Jackson and Leslie E. Ham, Marysville, Kans.; said Jackson assignor to said Ham Application September 25, 1953, Serial No. 382,320

2 Claims. (Cl. 97—47.5)

Our invention relates to a locking tool-bar for use on a three point hook up connecting a tractor, jeep or any other mechanical powered machine to an agricultural implement such as a cultivator or the like. Our tool-bar is for use instead of the rigid tool-bar which now comes with all tractors or power machines for use with three point hook up.

In operating with a rigid tool-bar one of the difficulties arises when the vehicle pulling the implement or the implement itself becomes stranded in the field as when the implement drops into a ditch or fill and it is impossible to get either the tractor or the implement out because of the resulting bind from the rigid bar. It is then impossible to move forward or backward and as the connection pins on the front and back of the bar are in a tight bind they cannot be removed to free the implement and the lift will not elevate the attached implement sufficiently to free the vehicle. It is then necessary to jack up the tractor or obtain another power unit to pull out the tractor and this may spring the implement and damage it.

With our invention when the implement is stuck, the stalled power unit with implement attached can be freed in the field without the operator leaving the tractor and he can drive forward as the power unit then has traction again. Or the operator can dismount and pull the two connecting pins and drive off and leave the implement.

Referring to the drawing for a more complete disclosure of the invention;

Figure 1 is a fragmentary elevation of the rear end of a tractor with the three point hook up, the full lines showing the normal locked operating position and the dotted lines showing the unlocked position;

Figure 2 is an elevation of the tool-bar partly in section, the dotted lines showing the unlocked position;

Figure 3 is a fragmentary section on the line 3—3 of Figure 2; and

Figure 4 is a transverse section on the line 4—4 of Figure 2.

In a well known type of three point hook up, the earth working implement 3 is attached to the tractor 6 by means of two lower spaced lift arms or drawer bars 2, one end of each arm being pivoted at 5 to the rear end of the tractor and the other end being pivoted to the bracket 4, to which is secured the implement 3. The brackets 4 converge at their upper ends to a point at which the upper single link or tool bar 1 is pivoted at one end, the other end of the tool bar being pivoted to the rear end of the tractor. The lift arms 2 are raised and lowered to fixed position according to the depth it is desired to work at, through the operating links 7, pivoted to the lift arms 2 and to the rear end of the tractor.

The above described construction is the one to which our invention and implement is particularly directed as is more fully hereinafter set forth.

Our improved tool-bar is made of two parts, one part 8 is for pivotal connection to the tractor and the other part 9 is for pivotal connection to the bracket 4. The length of the tool-bar may be adjusted to fit different tractors. This may be done by providing a threaded portion 10 engaging a nut 11 that is rigidly secured to the sleeve 12. The part 8 is provided with a forked portion 13 and fitting in the forked space is the part 9 which hinges on the headed pivot 14. Also fitting in the forked space is the lever 15 provided with a cam 16 hinged on a headed pivot 17. The lever 15 is provided with a notch 18 bounded by a flat portion 19 into which notch fits the tongue 20 of the part 9. When the tool bar is in locked position, the flat portion 19 overlies the flat portion 21 of the part 9. The part 9 may be made with a T cap 22. The cam locks the tool bar in a rigid position, and when the cam is locked, it prevents the bar from moving either in a horizontal or vertical direction. The length of adjustment can vary with the tool bar, and can be adjusted by twisting for depth control.

Normally the tool bar is in locked straight line position as shown in full lines in Figures 1 and 2. When the implement 3 gets stuck as when the tractor is on a lower portion of ground as when it drops into a ditch and loses traction, then the operator raises manually the lever 15 and this automatically jack-knives the tool-bar and lets the implement 3 elevate as shown in dotted lines in Figure 1, permitting the back wheels of the tractor 6 to drop down to solid footing and move out of the mire. When the implement is stuck, the release of the cam lever automatically continues the jack-knife action after the initial lift is given to the lever and this jack-knife action continues until the implement is freed. Once the implement is freed, the weight of the implement, after it is out of the hole or mire, where it has been stuck, pulls the tool-bar back into rigid horizontal position and the tractor and implement are then in operative position to go forward.

The main advantage is ease of operation in the field, and ability to free any stalled power unit with implement attached, by a flip of the hand, and the use of the cam bar working automatically, instead of being unable to free any stalled implement except by jacking it up, or by use of an additional power unit to free it, which in all instances springs and damages the tool. The implement that we have invented is safe; the handle comes forward toward the seat of the tractor, but stops and is prevented from coming in contact with the operator at any time.

Having described our invention specifically, what we claim as new and desire to secure by Letters Patent is:

1. A tool-bar for agricultural implements having two parts pivotally connected, means for pivotally connecting one end of the tool-bar directly to a source of motive power and the other end directly to an implement, a manually operated lever pivotally mounted on one part and engaging a tongue on the other part, the portion of the lever engaging the tongue being shaped to provide a notch to engage the tongue, one side of the notch having a cam face and the opposite side having a flat portion, the flat portion engaging the top of the tongue to prevent movement in a horizontal and vertical direction when in locked straight line rigid position.

2. In an attachment for a power tractor of the three point hook up type and which comprises a pair of lifting levers pivoted to the tractor and an implement and a tool-bar pivoted directly to the tractor and directly to the implement above the lifting levers, the improvement which comprises making the tool-bar in two parts pivotally connected, means for manually operating the tool bar to move the two parts into angular position relative to each other comprising a manually operated lever pivotally mounted on one part and engaging a tongue on the other part, the portion of the lever engaging the tongue being shaped to provide a notch to engage the tongue, one side of the notch having a cam face and the opposite side having a flat portion, the flat portion engaging the top of the tongue to prevent movement in a horizontal and vertical direction when in locked straight line position, the lever handle swinging forward on its pivot towards the tractor to unlock the parts and adapted to positively lift them to full unlocked position.

References Cited in the file of this patent

UNITED STATES PATENTS

| | | |
|---|---|---|
| 2,445,145 | Love | July 13, 1948 |
| 2,573,221 | Romig | Oct. 30, 1951 |
| 2,640,708 | Fraga | June 2, 1953 |